United States Patent
Meytin et al.

(10) Patent No.: US 10,824,408 B2
(45) Date of Patent: Nov. 3, 2020

(54) METHOD FOR AUTOMATIC APPLICATION DEPLOYMENT AND CLOUD MANAGEMENT NODE

(71) Applicant: Huawei Technologies Co., Ltd., Shenzhen (CN)

(72) Inventors: Dmitry Meytin, Hod Hasharon (IL); Zhuoyue Liu, Hangzhou (CN); Wei Wang, Hangzhou (CN); Shay Horovitz, Hod Hasharon (IL)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 240 days.

(21) Appl. No.: 16/012,397

(22) Filed: Jun. 19, 2018

(65) Prior Publication Data

US 2018/0300116 A1 Oct. 18, 2018

Related U.S. Application Data

(63) Continuation of application No. PCT/CN2016/074516, filed on Feb. 25, 2016.

(51) Int. Cl.
*G06F 9/455* (2018.01)
*G06F 8/60* (2018.01)
(Continued)

(52) U.S. Cl.
CPC ............ *G06F 8/60* (2013.01); *G06F 9/45533* (2013.01); *G06F 9/45541* (2013.01);
(Continued)

(58) Field of Classification Search
None
See application file for complete search history.

(56) References Cited

U.S. PATENT DOCUMENTS 8,543,636 B1* 9/2013 Barnes .................. G06F 9/4856
709/201
9,558,005 B2* 1/2017 Sathyanarayana ...... H04L 67/10
(Continued)

FOREIGN PATENT DOCUMENTS

CN 102622264 A 8/2012
CN 103605570 A 2/2014
(Continued)

OTHER PUBLICATIONS

Foreign Communication From a Counterpart Application, Chinese Application No. 201680001211.4, Chinese Office Action dated Jun. 21, 2019, 5 pages.
(Continued)

*Primary Examiner* — Bing Zhao
(74) *Attorney, Agent, or Firm* — Conley Rose, P.C.

(57) ABSTRACT

A method for automatic application deployment, and a cloud management node, where the method includes receiving an application orchestration template input by a user, parsing out an application model characteristic of an application from the application orchestration template, determining, according to the application model characteristic and a preset rule, a first instance creation manner corresponding to the application, determining a first computer device corresponding to the first instance creation manner in multiple computer devices, and sending a first instance creation command to the first computer device, the first instance creation command instructing the first computer device to create a first instance for the application according to the first instance creation manner. Therefore, application can be efficiently deployed automatically.

20 Claims, 6 Drawing Sheets

(51) Int. Cl.
  *H04L 29/08* (2006.01)
  *H04L 29/06* (2006.01)
(52) U.S. Cl.
  CPC .......... *G06F 9/45558* (2013.01); *H04L 29/06* (2013.01); *H04L 67/10* (2013.01); *G06F 2009/4557* (2013.01); *G06F 2009/45562* (2013.01); *G06F 2009/45591* (2013.01)

(56) References Cited

U.S. PATENT DOCUMENTS

| | | |
|---|---|---|
| 2013/0036208 A1 | 2/2013 | Dochez |
| 2014/0101300 A1 | 4/2014 | Rosensweig et al. |
| 2014/0143401 A1 | 5/2014 | Carlen et al. |
| 2015/0007169 A1 | 1/2015 | Li et al. |
| 2015/0163288 A1 | 6/2015 | Maes et al. |
| 2016/0004551 A1 | 1/2016 | Terayama et al. |
| 2016/0239290 A1 | 8/2016 | Li et al. |
| 2017/0063722 A1* | 3/2017 | Cropper .................. H04L 47/82 |
| 2018/0113734 A1 | 4/2018 | Yamato |

FOREIGN PATENT DOCUMENTS

| | | |
|---|---|---|
| CN | 103916378 A | 7/2014 |
| CN | 104253831 A | 12/2014 |
| CN | 104281496 A | 1/2015 |
| CN | 104335170 A | 2/2015 |
| EP | 3270288 A1 | 1/2018 |
| JP | 2011511360 A | 4/2011 |
| JP | 2014524096 A | 9/2014 |
| JP | 2014524608 A | 9/2014 |
| JP | 2015534696 A | 12/2015 |
| WO | 2009096971 A1 | 8/2009 |
| WO | 2013184134 A1 | 12/2013 |
| WO | 2015049789 A1 | 4/2015 |
| WO | 2016167086 A1 | 10/2016 |

OTHER PUBLICATIONS

Foreign Communication From a Counterpart Application, Chinese Application No. 201680001211.4, Chinese Search Report dated Jun. 11, 2019, 3 pages.
Foreign Communication From a Counterpart Application, European Application No. 16891002.4, European Search Report dated Jul. 4, 2018, 10 pages.
Foreign Communication From a Counterpart Application, Japanese Application No. 2018-532654, Japanese Office Action dated Jun. 3, 2019, 7 pages.
Foreign Communication From a Counterpart Application, Japanese Application No. 2018-532654, English Translation of Japanese Office Action dated Jun. 3, 2019, 8 pages.
Machine Translation and Abstract of Chinese Publication No. CN102622264, Aug. 1, 2012, 5 pages.
Machine Translation and Abstract of Chinese Publication No. CN103605570, Feb. 26, 2014, 9 pages.
Machine Translation and Abstract of Chinese Publication No. CN103916378, Jul. 9, 2014, 21 pages.
Machine Translation and Abstract of Chinese Publication No. CN104281496, Jan. 14, 2015, 21 pages.
Foreign Communication From a Counterpart Application, PCT Application No. PCT/CN2016/074516, English Translation of International Search Report dated Oct. 9, 2016, 2 pages.

* cited by examiner

3000

Obtain real-time monitoring information of running of an application on a first instance, where the real-time monitoring information reflects an execution status of the application in the first instance ~ S3100

Determine, according to the real-time monitoring information, whether to migrate the application from the first instance to a second instance, where the second instance is created in a second instance creation manner, and the second instance creation manner is different from the first instance creation manner ~ S3200

FIG. 4

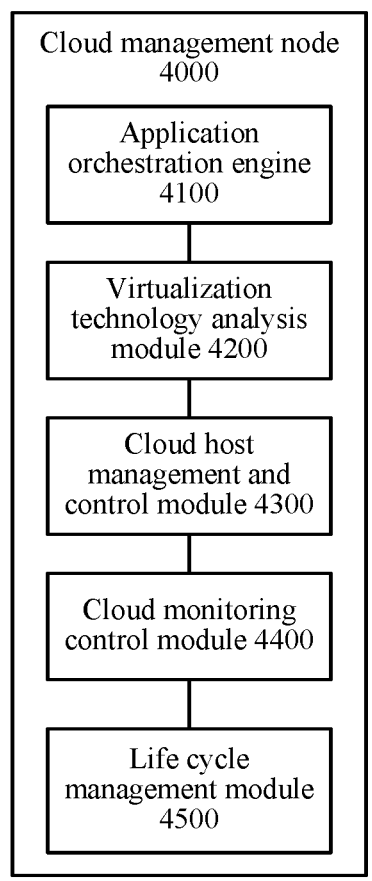

FIG. 5

METHOD FOR AUTOMATIC APPLICATION DEPLOYMENT AND CLOUD MANAGEMENT NODE

CROSS-REFERENCE TO RELATED APPLICATION

This application is a continuation of International Patent Application No. PCT/CN2016/074516 filed on Feb. 25, 2016, which is hereby incorporated by reference in its entirety.

TECHNICAL FIELD

The present application relates to the field of technologies, and in particular, to a method for automatic application deployment and a cloud management node.

BACKGROUND

With continuous development, a virtualization technology is becoming mature. Currently, two main methods are used to implement the virtualization technology. One method is based on a virtual machine (VM) management program (hypervisor), and includes Kernel-based VM (KVM), XEN, VMware virtualization, and the like. The other method is based on a host operating system (Host OS) isolation characteristic, and includes libcontainer, ROCKET, LINUX Container (LXC), OPENVZ, FREEBSD jail, SOLARIS Containers, and the like. In addition, there is, for example, a new technology improved from a hypervisor technology of JeOS. These virtualization technologies are increasingly applied to cloud computing.

Different types of applications have greatly different requirements for system resources. For example, the system resource may be a central processing unit (CPU), a memory, an input/output (I/O) port, or a network, and some applications need to ensure running efficiency by directly using non-virtualization (for example, bare-metal). For some applications such as a structured query language (SQL) database, a NoSQL database, a cache, or messaging, it is relatively easy to learn system resource requirements of the applications and select a virtualization technology. But for some types of programs, it is difficult from a perspective of a user or an administrator to select an optimal virtualization technology.

At present, a field related to automatic application deployment is mainly an automatic application deployment service in the cloud computing field. Further, automatic application deployment is performed using an application orchestration template supported by an application orchestration engine, for example, packing and configuration templates, which include some mainstream standards and types Topology and Orchestration Specification for Cloud Applications (TOSCA), OpenStack Heat, AMAZON Web Services (AWS) CloudFormation, DockerFile, PUPPET, Chef, and the like. These templates are already filled in with a platform (a system image) on which an application relies, and with a corresponding virtualization technology. These templates are filled in by a user manually, or by means of manual selection using a web guide page of a cloud console. In an existing automatic application deployment procedure, a cloud data center uses a relatively small quantity of virtualization technology types. Therefore, virtualization technology selection is all completed by the user, and full control permission is granted to the user. However, after various virtualization technologies are mature, the cloud data center will become a platform on which multiple virtualization technologies are mixed. Then, selection of the multiple virtualization technologies by the user becomes a problem, and incorrect selection not only reduces program running efficiency, but also wastes a data center resource.

In addition, in terms of application life cycle management functions, a current application deployment program can mainly perform group scale auto-scaling (Auto-Scaling), error recovery, and the like, but cannot perform real-time analysis and switching on virtualization technologies. In this case, after an application is deployed, a running environment of the application is determined. Flexibility is lacked and a virtualization technology type cannot be adjusted.

SUMMARY

This application provides a method for automatic application deployment, and a cloud management node in order to automatically select a virtualization technology.

According to a first aspect, a method for automatic application deployment is provided. The method is performed by a cloud management node, the cloud management node is deployed on at least one of multiple computer devices, and the method includes receiving an application orchestration template input by a user, parsing out an application model characteristic of an application from the application orchestration template, determining, according to the application model characteristic and a preset rule, a first instance creation manner corresponding to the application, determining a first computer device corresponding to the first instance creation manner in the multiple computer devices, and sending a first instance creation command to the first computer device, where the first instance creation command is used to instruct the first computer device to create a first instance for the application according to the first instance creation manner.

Therefore, according to the method for automatic application deployment provided in this application, a virtualization technology can be automatically selected during application deployment. When a cloud data center supports more virtualization technologies, conventional application deployment which requires a user to determine an instance creation manner used by an application can be avoided. Work of the user can be reduced, and problems of low application efficiency and data center resource waste that are caused by incorrect selection of the user can be avoided to an extent.

With reference to the first aspect, in an implementation of the first aspect, each of the multiple computer devices may include an instance management module, and the first computer device includes a first instance management module. Sending, by the cloud management node, a first instance creation command to the first computer device includes sending, by the cloud management node, the first instance creation command to the first instance management module, where the first instance creation command includes the first instance creation manner. The method further includes creating, by the first instance management module, the first instance for the application in the first instance creation manner, feeding back, by the first instance management module, an instance creation result of the application to the cloud management node, and running, by the cloud management node, the application according to the instance creation result.

With reference to the first aspect and the foregoing implementation of the first aspect, in another implementation of the first aspect, each computer device in the server further includes a cloud host management agent module, and the first computer device includes a first cloud host management agent module. Sending, by a cloud host management and control module, a first instance deployment command to the first instance management module in the first computer device includes sending, by the cloud host management and control module, the first instance creation command to the first instance management module using the first cloud host management agent module, and feeding back, by the first instance management module, a deployment result of the application to the cloud management node using the cloud host management and control module includes feeding back, by the first instance management module, the deployment result of the application to the cloud management node using the first cloud host management agent module.

With reference to the first aspect and the foregoing implementations of the first aspect, in another implementation of the first aspect, the first instance creation manner is a bare-metal creation manner or a virtualization technology creation manner.

With reference to the first aspect and the foregoing implementations of the first aspect, in another implementation of the first aspect, the preset rule includes that if the application is a non-scalable application, the first instance creation manner is the bare-metal creation manner, the parsing out an application model characteristic of an application from the application orchestration template includes determining, by the cloud management node according to auto scaling group information in the application orchestration template, that the application model characteristic includes that the application is the non-scalable application, and determining, according to the application model characteristic and a preset rule, a first instance creation manner corresponding to the application includes determining, according to the preset rule, that the first instance creation manner is the bare-metal creation manner when the application is the non-scalable application.

Optionally, when determining, according to the auto scaling group information in the application orchestration template, that the application model characteristic includes that the application is the non-scalable application, the cloud management node may determine, according to the preset rule, that the bare-metal creation manner is not applicable to the application during instance deployment for the application.

It should be understood that, when the application is the non-scalable application, it may indicate that the application is neither scalable horizontally, nor scalable vertically. On the contrary, when the application is a scalable application, it may indicate that the application may be scalable horizontally, or may be scalable vertically. Horizontal scaling may refer to adjusting a group scale of instances by increasing or reducing a quantity of the instances, and vertical scaling may refer to adjusting a group scale of instances by increasing or reducing resources belonging to a single instance in a group.

With reference to the first aspect and the foregoing implementations of the first aspect, in another implementation of the first aspect, the preset rule includes that if the application is not in a running state, or if a running state of the application is a stable state, the first instance creation manner is a container creation manner, the parsing out an application model characteristic of an application from the application orchestration template includes determining, according to processing content information of the application in the application orchestration template, that the application model characteristic includes that the application is not in the running state, or the running state of the application is the stable state, and determining, according to the application model characteristic and a preset rule, a first instance creation manner corresponding to the application includes determining, according to the preset rule, that the first instance creation manner is the container creation manner when the application is not in the running state, or when the running state of the application is the stable state.

It should be understood that the container creation manner belongs to the virtualization technology creation manner. The container creation manner may be a manner of creating a container using the virtualization technology, for example, a manner of creating a container using Docker. The container may be further a LINUX container.

With reference to the first aspect and the foregoing implementations of the first aspect, in another implementation of the first aspect, the preset rule includes that if a time limit to a failover of the application is less than or equal to a preset value, the first instance creation manner is a container creation manner, the parsing out an application model characteristic of an application from the application orchestration template includes determining, according to a service level agreement (SLA) of the application in the application orchestration template, that the application model characteristic includes that the time limit to the failover of the application is less than or equal to the preset value, and determining, according to the application model characteristic and a preset rule, a first instance creation manner corresponding to the application includes determining, according to the preset rule, that the first instance creation manner is the container creation manner when the time limit to the failover of the application is less than or equal to the preset value. The container creation manner belongs to the virtualization technology creation manner.

With reference to the first aspect and the foregoing implementations of the first aspect, in another implementation of the first aspect, the preset rule includes that if the application supports an OSv operating system, the first instance creation manner is an OSv creation manner, the parsing out an application model characteristic of an application from the application orchestration template includes determining, according to an operating system supported by the application in the application orchestration template, that the application model characteristic includes that the application supports the OSv operating system, and determining, according to the application model characteristic and a preset rule, a first instance creation manner corresponding to the application includes determining, according to the preset rule, that the first instance creation manner is the OSv creation manner when the application supports the OSv operating system. The OSv creation manner belongs to the virtualization technology creation manner.

With reference to the first aspect and the foregoing implementations of the aspect, in another implementation of the first aspect, the first instance creation manner is a VM creation manner.

With reference to the first aspect and the foregoing implementations of the first aspect, in another implementation of the first aspect, the method further includes obtaining real-time monitoring information of running of the application in the first instance, where the real-time monitoring information reflects an execution status of the application in the first instance, and determining, according to the real-time monitoring information, whether to migrate the application from the first instance to a second instance, where the second instance is created in a second instance creation manner, and the second instance creation manner is different from the first instance creation manner.

In this way, according to the method for automatic application deployment provided in this application, virtualization technology can be automatically selected during application deployment, and moreover, whether to migrate the application from a current instance to another instance can be determined when the application runs. In this way, when a cloud data center supports more virtualization technologies, a virtualization technology type can be selected and adjusted more flexibly, thereby improving resource utilization, and avoiding resource waste.

With reference to the first aspect and the foregoing implementations of the first aspect, in another implementation of the first aspect, the multiple computer devices include a second computer device, the second computer device corresponds to the second instance creation manner, and the method includes sending a second instance creation command to the second computer device when it is determined to migrate the application from the first instance to the second instance, where the second instance creation command is used to instruct the second computer device to create the second instance for the application according to the second instance creation manner, and migrating the application to the second instance for running.

With reference to the first aspect and the foregoing implementations of the first aspect, in another implementation of the first aspect, migrating the application to the second instance for running includes instructing the second computer device to run the application in the second instance based on a data source used when the application runs in the first instance.

With reference to the first aspect and the foregoing implementations of the first aspect, in another implementation of the first aspect, if the application is in the running state, migrating the application to the second instance for running includes instructing the second computer device to obtain a running state of running of the application in the first instance, and running the application in the second instance based on the obtained running state.

With reference to the first aspect and the foregoing implementations of the first aspect, in another implementation of the first aspect, the application is a database, and determining, according to the real-time monitoring information, whether to migrate the application from the first instance to a second instance includes determining, according to the real-time monitoring information, that the database is in an idle state, and determining to migrate the application from the first instance to the second instance, where the second instance is created in the container creation manner.

According to a second aspect, a method for automatic application deployment is provided. The method is performed by a cloud management node, the cloud management node is deployed on at least one of multiple computer devices, the multiple computer devices include a first computer device, the first computer device creates a first instance for an application in a first instance creation manner, and the method includes obtaining real-time monitoring information of running of the application in the first instance when the application runs in the first instance, where the real-time monitoring information reflects an execution status of the application in the first instance, and determining, according to the real-time monitoring information, whether to migrate the application from the first instance to a second instance, where the second instance is created in a second instance creation manner, and the second instance creation manner is different from the first instance creation manner.

Therefore, according to the method for automatic application deployment provided in this application, whether to migrate the application from a current instance to another instance can be determined when the application runs. In this way, when a cloud data center supports more virtualization technologies, real-time analysis and switching of the virtualization technologies can be implemented, and a virtualization technology type can be adjusted more flexibly, thereby improving resource utilization, and avoiding resource waste.

With reference to the second aspect and the foregoing implementation of the second aspect, in another implementation of the second aspect, determining, according to the real-time monitoring information, whether to migrate the application from the first instance to a second instance includes determining, according to the real-time monitoring information using a reinforcement learning reinforcement learning algorithm, a first reward obtained when the application is retained in the first instance and is not migrated, and a second reward obtained when the application is migrated from the first instance to the second instance, and determining to retain the application in the first instance and not to migrate the application when the first reward is higher than or equal to the second reward, or determining to migrate the application from the first instance to the second instance when the first reward is lower than the second reward.

With reference to the second aspect and the foregoing implementation of the second aspect, in another implementation of the second aspect, the determining, according to the real-time monitoring information using a reinforcement learning reinforcement learning algorithm, a first reward obtained when the application is retained in the first instance and is not migrated, and a second reward obtained when the application is migrated from the first instance to the second instance includes determining the first reward according to a formula (1):

$$A * \frac{1 - e^{-(1 - \frac{responseTime}{Time})}}{\prod \text{Utilization}} * (1 + CostOfTransition) * (1 + CostOfTechnology) \quad (1)$$

where A is an adjustment coefficient, responseTime represents an actual time of response of the application to an external request, Time represents a preset time of response of the application to the external request, Utilization represents a resource utilization of each of multiple resources occupied when the application runs, CostOfTransition is set to 0, CostOfTechnology=Σ(B*C), B represents each of multiple overheads generated by a virtualization technology corresponding to the first instance creation manner, and C represents a weight of B in the application, and determining the second reward according to the formula (1), where responseTime represents an actual time of response of the application to an external request, Time represents a preset time of response of the application to the external request, Utilization represents a resource utilization of each of multiple resources occupied when the application runs, CostOfTransition represents a sum of an overhead for migration from the first instance and an overhead for migration to the second instance, CostOfTechnology=Σ(B*C), B represents each of multiple overheads generated by a virtualization technology corresponding to the second instance creation manner, and C represents a weight of B in the application. Optionally, for each virtualization technology, corresponding CostOfTechnology may be fixedly set to a constant.

With reference to the second aspect and the foregoing implementation of the second aspect, in another implementation of the second aspect, determining, according to the real-time monitoring information using a reinforcement learning reinforcement learning algorithm, a first reward obtained when the application is retained in the first instance and is not migrated, and a second reward obtained when the application is migrated from the first instance to the second instance includes determining the first reward according to a formula (2):

$$A * \frac{1 - e^{-\left(1 - \frac{throughput}{TP}\right)}}{\prod \text{Utilization}} * \quad (2)$$
$$(1 + CostOfTransition) * (1 + CostOfTechnology)$$

where A is an adjustment coefficient, throughput represents a throughput when the application runs, TP represents a preset value of the throughput when the application runs, Utilization represents a resource utilization of each of multiple resources occupied when the application runs, CostOfTransition is set to 0, CostOfTechnology=Σ(B*C), B represents each of multiple overheads generated by a virtualization technology corresponding to the first instance creation manner, and C represents a weight of B in the application, and determining the second reward according to the formula (2), where A is an adjustment coefficient, throughput represents a throughput when the application runs, TP represents a preset value of the throughput when the application runs, Utilization represents a resource utilization of each of multiple resources occupied when the application runs, CostOfTransition represents a sum of an overhead for migration from the first instance and an overhead for migration to the second instance, CostOfTechnology=Σ(B*C), B represents each of multiple virtualization technology overheads generated in the second instance creation manner, and C represents a weight of B in the application. Optionally, for each virtualization technology, corresponding CostOfTechnology may be fixedly set to a constant.

It should be understood that throughput in the formula (2) may be a data throughput, that is, throughput represents a data throughput when the application runs, and correspondingly, TP represents a preset value of the data throughput when the application runs, alternatively, throughput may be a throughput brought by a network IO request, that is, throughput represents the throughput brought by the network IO request when the application runs, and correspondingly, TP represents a preset value of the throughput brought by the network IO request when the application runs.

With reference to the second aspect and the foregoing implementations of the second aspect, in another implementation of the second aspect, the application is a database, and determining, according to the real-time monitoring information, whether to migrate the application from the first instance to a second instance includes determining, according to the real-time monitoring information, that the database is in an idle state, and determining to migrate the application from the first instance to the second instance, where the second instance is created in the container creation manner. In this way, resource waste can be avoided, and no data is lost from the database.

With reference to the second aspect and the foregoing implementations of the second aspect, in another implementation of the second aspect, if the first instance currently used by the application is a VM, the cloud management node may determine, according to the real-time monitoring information of the application, that memory used by the application at a work stage of the application always changes slowly (for example, increases slowly, or decreases slowly). In this case, migrating the application to a container has a better effect. In this way, because a memory resource of the container may be changed at any time, migration to the container may not waste memory. If an in-running analysis submodule determines, according to the real-time monitoring information, that a volume of memory used by the application at a stage is fixed, the application may continue using the VM without migration.

With reference to the second aspect and the foregoing implementations of the second aspect, in another implementation of the second aspect, if the first instance currently used by the application is a VM, the cloud management node may determine, according to the real-time monitoring information of the application, that the application has a large quantity of threads and context switching at a work stage. In this case, performing scheduling using the VM causes a large quantity of CPU overheads (because the VM itself virtualizes a CPU, related multi-thread switching causes a greater overhead). In this case, migration to the container has a better effect.

With reference to the second aspect and the foregoing implementations of the second aspect, in another implementation of the second aspect, if the first instance currently used by the application is a container, when the cloud management node determines, according to the real-time monitoring information, that the application needs to operate kernel sensitive data at a work stage, insecurity to another container may be caused according to a case in which containers share a same kernel. Therefore, at such a work stage, the application should be migrated to the second instance in consideration of security. The second instance is a VM.

With reference to the second aspect and the foregoing implementations of the second aspect, in another implementation of the second aspect, if the first instance currently used by the application is a container, during migration of the container, for example, when the application needs to be migrated as a whole to a physical machine, the container cannot completely process migration invoked by a system, but a VM can ensure complete migration. Therefore, when an instance in which the application is located needs to be migrated as a whole, the application may be migrated to the second instance first, where the second instance is a VM, and after the application runs on the VM, the application is migrated as a whole, for example, to the physical machine.

With reference to the second aspect, in an implementation of the second aspect, the multiple computer devices include a second computer device, the second computer device corresponds to the second instance creation manner, and the method further includes sending a second instance creation command to the second computer device when it is determined to migrate the application from the first instance to the second instance, where the second instance creation command is used to instruct the second computer device to create the second instance for the application according to the second instance creation manner, and migrating the application to the second instance for running.

With reference to the second aspect and the foregoing implementations of the second aspect, in another implementation of the second aspect, migrating the application to the second instance for running includes instructing the second computer device to run the application in the second instance based on a data source used when the application runs in the first instance.

With reference to the second aspect and the foregoing implementations of the second aspect, in another implementation of the second aspect, if the application is in a running state, migrating the application to the second instance for running includes instructing the second computer device to obtain a running state of running of the application in the first instance, and running the application in the second instance based on the obtained running state.

According to a third aspect, a cloud management node of a cloud computing data center is provided, and is configured to perform the method according to any one of the first aspect or the possible implementations of the first aspect. Further, the cloud management node includes a module configured to perform the method according to any one of the first aspect or the possible implementations of the first aspect.

According to a fourth aspect, a cloud management node of a cloud computing data center is provided, and is configured to perform the method according to any one of the first aspect or the possible implementations of the first aspect. Further, the cloud management node includes a module configured to perform the method according to any one of the first aspect or the possible implementations of the first aspect.

According to a fifth aspect, a cloud management node of a cloud computing data center is provided, and includes a memory and a processor. The memory is configured to store an instruction, the processor is configured to execute the instruction stored in the memory, and the instruction stored in the memory, when being executed, causes the processor to perform the method according to any one of the first aspect or the possible implementations of the first aspect.

According to a sixth aspect, a cloud management node of a cloud computing data center is provided, and includes a memory and a processor. The memory is configured to store an instruction, the processor is configured to execute the instruction stored in the memory, and the instruction stored in the memory, when being executed, causes the processor to perform the method according to any one of the first aspect or the possible implementations of the first aspect.

According to a seventh aspect, a computer readable medium is provided, and is configured to store a computer program. The computer program includes an instruction used to perform the method according to any one of the first aspect or the possible implementations of the first aspect.

According to an eighth aspect, a computer readable medium is provided, and is configured to store a computer program. The computer program includes an instruction used to perform the method according to any one of the first aspect or the possible implementations of the first aspect.

BRIEF DESCRIPTION OF DRAWINGS

To describe the technical solutions in the embodiments of the present application more clearly, the following briefly describes the accompanying drawings required for describing the embodiments of the present application. The accompanying drawings in the following description show merely some embodiments of the present application, and a person of ordinary skill in the art may still derive other drawings from these accompanying drawings without creative efforts.

FIG. 4 is still another schematic flowchart of a method for automatic application deployment according to an embodiment of the present application;

FIG. 5 is a schematic block diagram of a cloud management node of a cloud computing data center according to an embodiment of the present application;

DESCRIPTION OF EMBODIMENTS

The following clearly describes the technical solutions in the embodiments of the present application with reference to the accompanying drawings in the embodiments of the present application.

Figure 1:
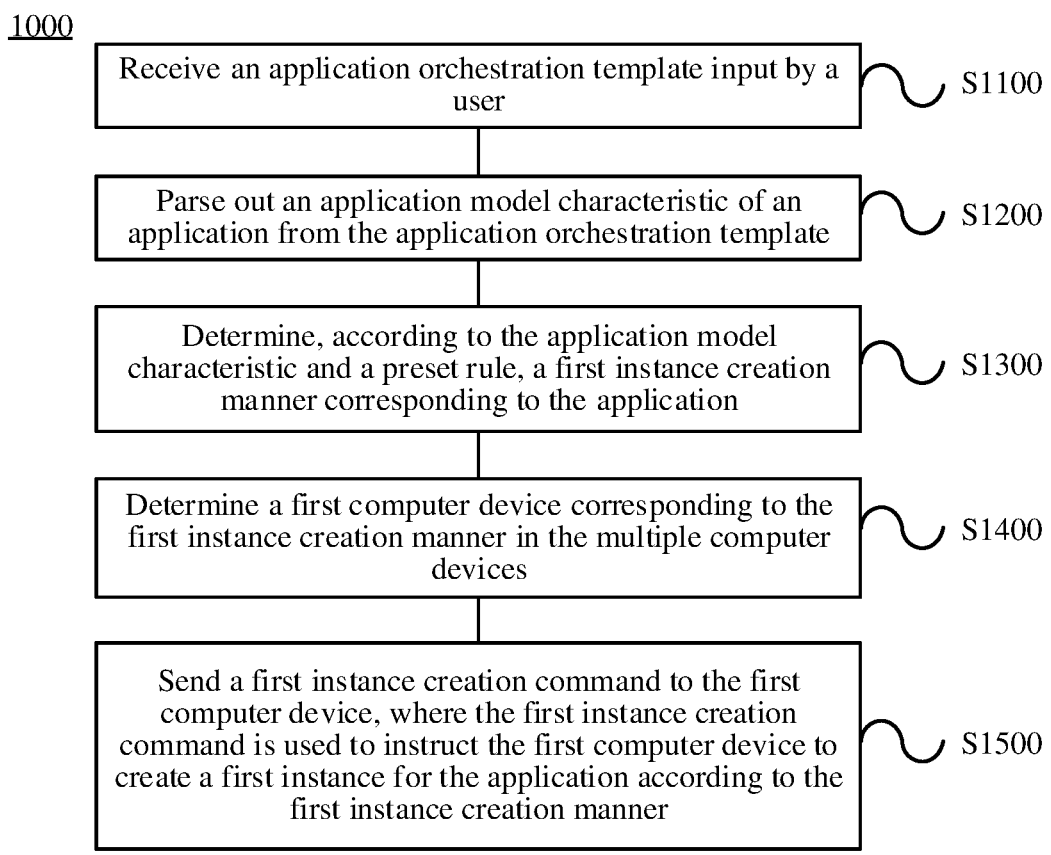
FIG. 1 is a schematic flowchart of a method for automatic application deployment according to an embodiment of the present application.
Figure 2:
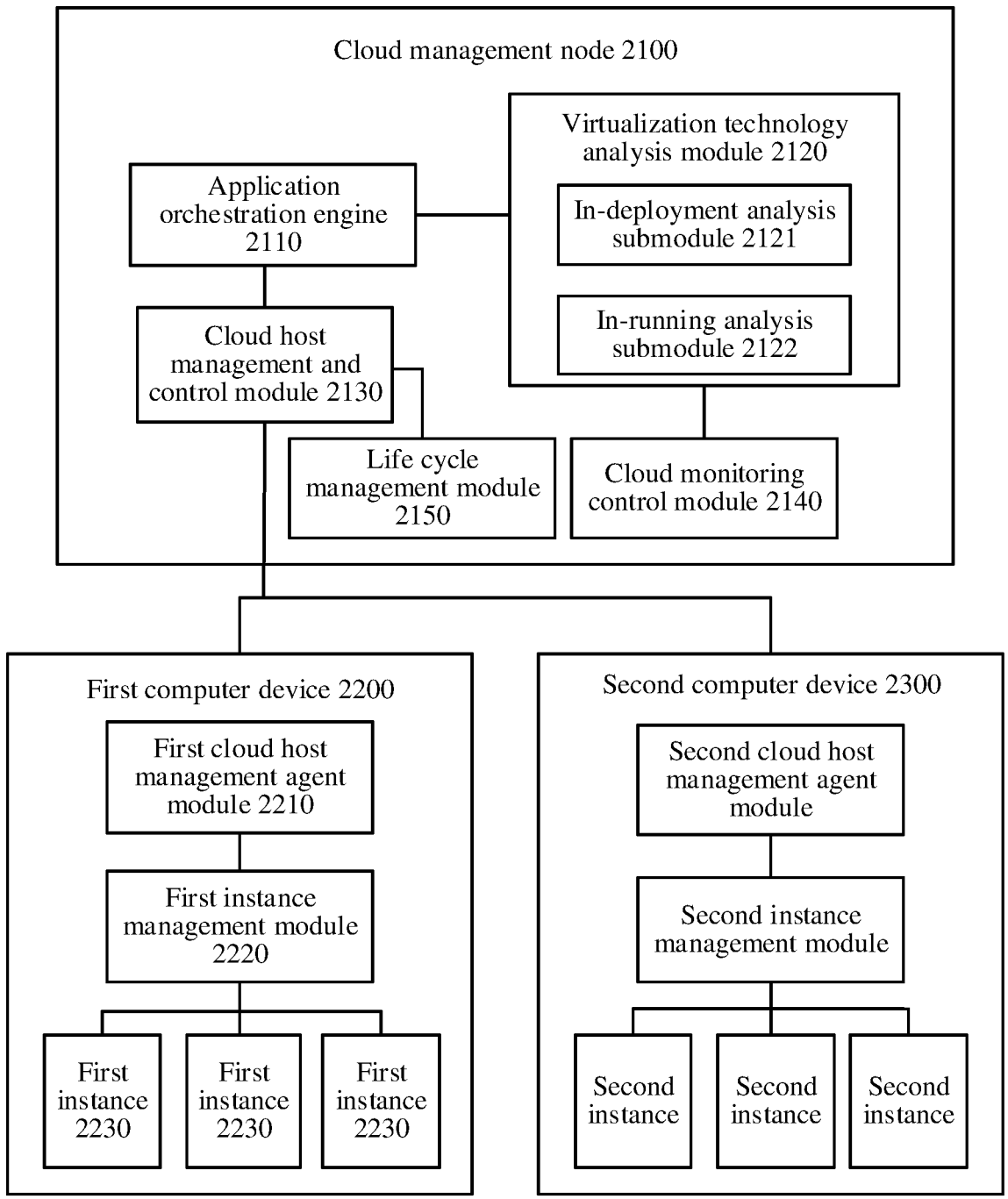
FIG. 2 is a schematic block diagram of an apparatus for automatic application deployment according to an embodiment of the present application.

FIG. 1 shows a method 1000 for automatic application deployment according to an embodiment of the present application. The method 1000 for automatic application deployment may be applied to a cloud computing data center shown in FIG. 2. The method 1000 may be performed by a cloud management node 2100. As shown in FIG. 2, the cloud computing data center may include multiple computer devices. Two computer devices, a first computer device 2200 and a second computer device 2300, are used as an example. The cloud management node 2100 may be deployed on at least one of the multiple computer devices. For example, the cloud management node 2100 is deployed on the first computer device 2200. For another example, modules included in the cloud management node 2100 are deployed on the first computer device 2200 and the second computer device 2300.

The cloud management node 2100 may further include multiple modules, for example, at least one of an application orchestration engine 2110, a virtualization technology analysis module 2120, a cloud host management and control module 2130, a cloud monitoring control module 2140, or a life cycle management module 2150. Optionally, the cloud management node 2100 may further include another part, for example, a cloud monitoring database used to store monitoring data determined by the cloud monitoring control module. The present application is not limited thereto.

Further, the method 1000 for automatic application deployment may be performed by the cloud management node 2100 in the apparatus shown in FIG. 2. The method 1000 includes the following steps.

Step S1100. Receive an application orchestration template input by a user. The application orchestration template is an orchestration engine.

Further, the application orchestration template input by the user may be received by the application orchestration engine 2110 in the cloud management node 2100.

It should be understood that an application orchestration template input in an application deployment process in other approaches is modified in this embodiment of the present application. An instance creation manner used by an application no longer needs to be determined when the user inputs the application orchestration template, that is, a virtualization technology or bare-metal creation manner to be used does not need to be determined, and only an application model characteristic of the application needs to be provided. The application orchestration template in this embodiment of the present application is a document that is compiled according to an application orchestration specification and that is used for deployment of an application stack. That is, the application orchestration template specifies modules included by an entire application (or application stack) and a relationship between the modules. A description of the application model characteristic may be considered as a part of an application orchestration template language specification, and a common template language may describe the modules of the application and an invoking relationship between the modules such that after being deployed, the modules run in a mutually associated manner. That is, an original application orchestration template also needs to provide an application model characteristic. Herein, when inputting the application orchestration template, the user needs to provide only the application model characteristic in the application orchestration template without providing a selected virtualization technology as a part of the application orchestration template.

Optionally, in an embodiment, when the application orchestration engine 2110 receives the application orchestration template input by the user, or receives the application model characteristic input by the user, similar to the other approaches, the user may be guided by a web page to create an application orchestration template of an application, or an application orchestration template that is already created may be directly imported over a command line interface. Herein, however, a virtualization technology type used during instance creation in the application deployment process is not specified in the application orchestration template, and only the application model characteristic is provided.

Step S1200. Parse out an application model characteristic of an application from the application orchestration template.

Further, after receiving the application orchestration template input by the user, the application orchestration engine 2110 in the cloud management node 2100 may parse the application orchestration template, and determine the application model characteristic of the application. For example, the application orchestration engine 2110 may parse the application orchestration template, and determine that the application model characteristic includes dependency between the modules of the application, whether the application can perform horizontal or vertical expansion, whether load balancing exists, and the like.

Optionally, in an embodiment, the application orchestration engine 2110 may parse the application orchestration template input by the user, and determine, according to auto scaling group (auto scaling group) information included in the application orchestration template, that the application model characteristic may include whether the application needs to perform horizontal expansion, and may also include whether the application needs to perform vertical expansion. Further, when the application orchestration template input by the user includes the auto scaling group information, it may be determined that the application model characteristic includes that the application is a scalable application, that is, an instance of the application may be run according to an actual running requirement. The expansion may include the horizontal expansion and the vertical expansion. The horizontal expansion is also referred to as horizontal scaling, and refers to adjusting a group scale of instances by increasing or reducing a quantity of the instances, and the vertical expansion is also referred to as vertical scaling, and refers to adjusting a group scale of the instances by increasing or reducing resources belonging to a single instance in a group.

Optionally, in an embodiment, the application orchestration engine 2110 may parse the application orchestration template input by the user, and determine, according to content information to be processed by the application, that the application model characteristic may include whether the application is in a running state (stateful), and if the application is in the running state, further determine whether the running state is a stable state. For example, if the application orchestration template records that the application is of a web type, the application orchestration engine 2110 may determine that the application model characteristic is that the application is not in the running state, or if the application orchestration template records that an application type of the application is data processing, the application orchestration engine 2110 may determine that the application model characteristic is that the application is in the running state, and may further determine, according to specific content of the data processing, whether the running state of the application is the stable state.

Optionally, in an embodiment, the application orchestration engine 2110 may parse the application orchestration template input by the user, and determine, according to an SLA of the application, whether the application has a time limit requirement, that is, determine that the application model characteristic includes a time limit requirement of the application. For example, the application may have an SLA requirement for network bandwidth or a response time, or the application may have an SLA requirement for a failover to require the failover to be completed within a preset time, that is, have a time requirement for the failover. In this case, the application model characteristic includes a time limit requirement for the failover. However, this embodiment of the present application is not limited thereto.

Optionally, in an embodiment, the application orchestration engine 2110 may parse the application orchestration template input by the user, and determine an operating system supported by the application, that is, determine that the application model characteristic includes the operating system supported by the application. For example, the application model characteristic is that the application may support an OSv system, or does not support an OSv system but supports another operating system, or that the application may support multiple operating systems. The present application is not limited thereto.

Step S1300. Determine, according to the application model characteristic and a preset rule, a first instance creation manner corresponding to the application.

Further, the virtualization technology analysis module 2120 in the cloud management node 2100 may include an in-deployment analysis submodule 2121, the application orchestration engine 2110 sends the determined application model characteristic to the in-deployment analysis submodule 2121, and the in-deployment analysis submodule 2121 determines, according to the application model characteristic and the preset rule, an instance creation manner corresponding to the application, that is, the first instance creation manner.

In this embodiment of the present application, the in-deployment analysis submodule 2121 may include multiple decision methods for determining an instance creation manner. The instance creation manner herein includes a virtualization technology creation manner or a bare-metal creation manner, and the decision method for determining the instance creation manner may be a method shown by a decision tree in FIG. 3.

Figure 3:
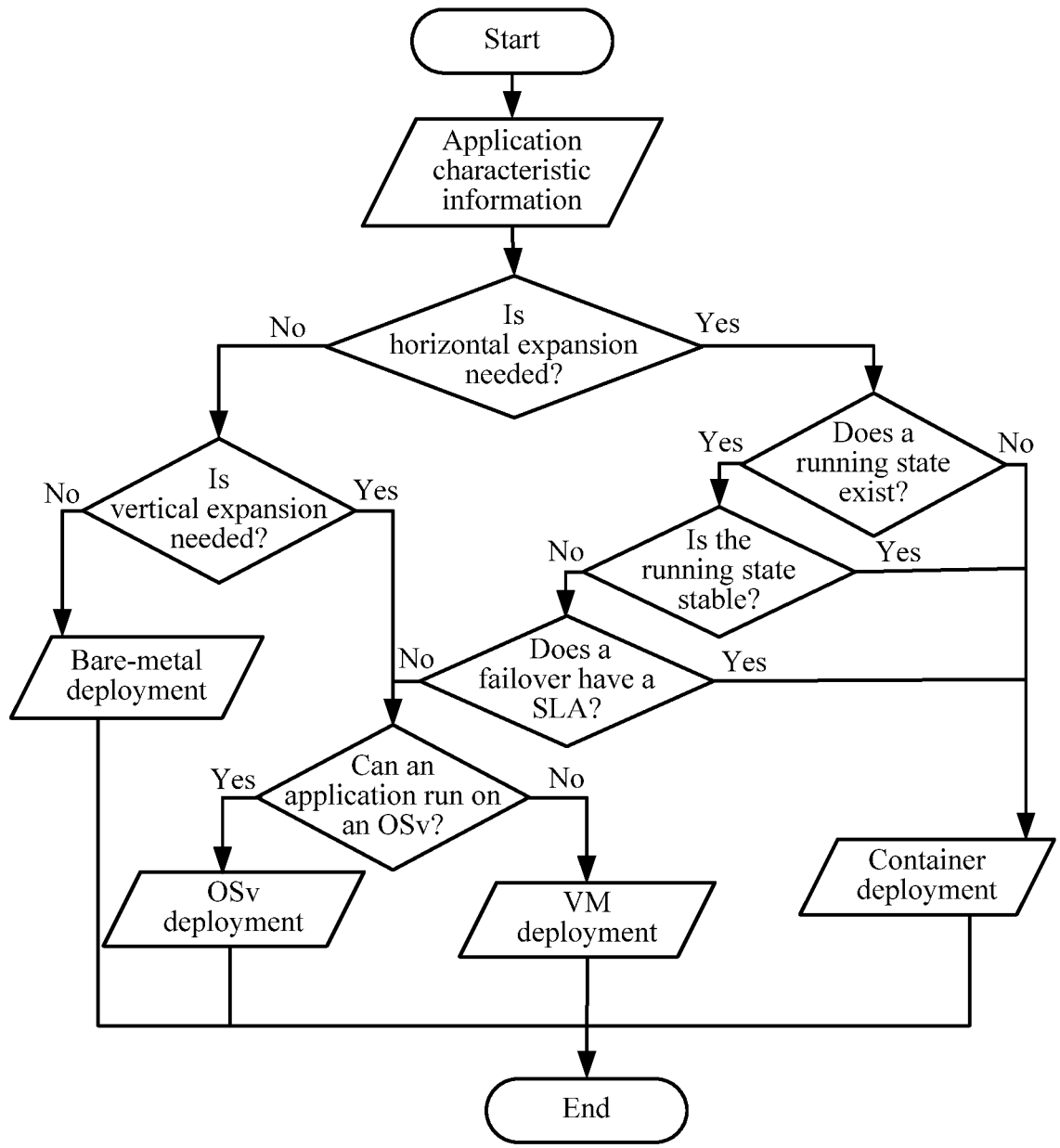
FIG. 3 is another schematic flowchart of a method for automatic application deployment according to an embodiment of the present application.

Further, for example, as shown in FIG. 3, the in-deployment analysis submodule 2121 may determine, according to the application model characteristic, the first instance creation manner corresponding to the application. The in-deployment analysis submodule 2121 may first determine, according to the application model characteristic, whether the application needs horizontal expansion, may determine whether the application needs vertical expansion if the application does not need horizontal expansion, and may determine that the first instance creation manner corresponding to the application is bare-metal deployment if the application does not need vertical expansion either. That is, a physical machine rather than a VM is deployed for the application.

If it is determined, according to the application model characteristic, that the application needs horizontal expansion, the in-deployment analysis submodule 2121 may further determine whether the application is in a running state (stateful), and if the application is not in the running state, may determine that the first instance creation manner corresponding to the application is container deployment. The container deployment herein may refer to creating a container using a virtualization technology, for example, creating the container using Docker.

If it is determined, according to the application model characteristic, that the application is in the running state, the in-deployment analysis submodule 2121 may further determine whether the running state of the application is stable, and if the running state of the application is a stable state, the in-deployment analysis submodule 2121 may further determine that the first instance creation manner corresponding to the application is the container deployment.

If the running state of the application is not the stable state, the in-deployment analysis submodule 2121 may further determine whether a failover of the application has the SLA, that is, whether the failover has a time limit, and if the failover has the time limit, and the time is very short, the in-deployment analysis submodule 2121 may determine that the first instance creation manner corresponding to the application is the container deployment.

If a failover of the application does not have the SLA, that is, the failover does not have the time limit, or the failover has the time limit but the time limit is relatively long, the in-deployment analysis submodule 2121 may further determine, according to the application model characteristic, an operating system that can be supported by the application. For example, if the application may support an OSv system, the in-deployment analysis submodule 2121 may determine that the first instance creation manner corresponding to the application is OSv deployment, or if the application does not support an OSv system, the in-deployment analysis submodule 2121 may determine that the first instance creation manner corresponding to the application is VM deployment.

It should be understood that if the in-deployment analysis submodule 2121 determines that the first instance creation manner corresponding to the application is the VM deployment, and a VM creation manner refers to creating a VM using a virtualization technology, that is, multiple virtualization technologies may be used, a specific virtualization technology to be used may further be determined by the in-deployment analysis submodule 2121 according to the preset rule in a way similar to that shown in FIG. 3. The determining ends until a virtualization technology to be used is determined.

It may be understood that if the in-deployment analysis submodule 2121 determines that the first instance creation manner corresponding to the application is the container deployment, because Docker is a most frequently used virtualization management program for managing container deployment in the other approaches, the determining may end after it is determined that the first instance creation manner is the container deployment, and a Docker management program is used to create a container, and if a virtualization management program for managing container deployment includes more virtualization manners, the in-deployment analysis submodule 2121 may further perform, after determining that the first instance creation manner is the container deployment, determining according to the preset rule in a way similar to that shown in FIG. 3. Determining ends when a virtualization management program to be used to create the container is determined.

Step S1400. Determine a first computer device corresponding to the first instance creation manner in the multiple computer devices.

In this embodiment of the present application, after determining the first instance creation manner, the in-deployment analysis submodule 2121 in the cloud management node 2100 may send the first instance creation manner to the application orchestration engine 2110. After receiving the first instance creation manner, the application orchestration engine 2110 may continue to create an instance for the application.

Further, the application orchestration engine 2110 may send a deployment command to the cloud host management and control module 2130 in the cloud management node 2100, and the deployment command includes the first instance creation manner determined by the in-deployment analysis submodule 2121, and the cloud host management and control module 2130 determines, according to the deployment command, the first computer device 2200 in the multiple computer devices that corresponds to the first instance creation manner. The cloud host management and control module 2130 may store a correspondence between each of the multiple computer devices and a corresponding instance creation manner, and the cloud host management and control module 2130 may compare, according to the first instance creation manner in the deployment command, each computer device with the correspondence to determine that a corresponding computer device is the first computer device 2200.

Step S1500. Send a first instance creation command to the first computer device, where the first instance creation command is used to instruct the first computer device to create a first instance for the application according to the first instance creation manner.

Further, the cloud host management and control module 2130 in the cloud management node 2100 may send the first instance creation command to a first cloud host management agent module 2210 in the first computer device 2200, and the first cloud host management agent module 2210 sends the first instance creation command to a first instance management module 2220, where the first instance management module 2220 corresponds to the first instance creation manner. For example, the first instance creation manner may be KVM, and correspondingly, the first instance management module 2220 is a virtualization management program KVM hypervisor. In this case, the first instance creation command is sent to the KVM hypervisor. Alternatively, when the first instance creation manner is bare-metal deployment, the first instance management module 2220 may be a physical machine management node, and the bare-metal deployment corresponds to the physical machine management node, that is, the first instance creation command is sent to the physical machine management node.

In this embodiment of the present application, after receiving the first instance creation command including the first instance creation manner, the first instance management module 2220 creates the first instance for the application according to the first instance creation command. As shown in FIG. 2, three first instances 2230 may be created for the application. A specific instance creation method may follow the other approaches. For example, the first instance management module 2220 may be a virtualization management program, for example, the KVM hypervisor, and correspondingly, the first instance creation manner is creating a VM using KVM. When the first instance creation manner is creating a VM, the KVM hypervisor deploys one or more VMs for the application. The VM herein is a first instance 2230, and a resource occupied by the VM may be determined according to the application and the virtualization technology KVM. Alternatively, the first instance management module 2220 may be the virtualization management program Docker, the Docker is used to create a container, and correspondingly, the first instance creation manner is deploying a container, and when the first instance creation manner is deploying a container, the Docker may create at least one container, and the at least one container is the first instance 2230.

In this embodiment of the present application, after completing instance creation, the first computer device 2200 may return a creation result to the application orchestration engine 2110 using the cloud host management and control module 2130. After determining, according to the creation result of the instance, that the instance creation is completed, the application orchestration engine 2110 may perform remaining work of deployment of the application, for example, content such as installation of middleware related to an application model, installation of the application, and initialization script running, and may further configure monitoring content for a cloud monitoring system, and then run the application after the application orchestration engine 2110 completes the work.

Therefore, according to the method for automatic application deployment provided in this application, a virtualization technology can be automatically selected during application deployment. When a cloud data center supports more virtualization technologies, conventional application deployment which requires a user to determine an instance creation manner used by an application can be avoided. Work of the user can be reduced, and problems of low application efficiency and data center resource waste that are caused by incorrect selection of the user can be avoided to an extent.

In this embodiment of the present application, in a running process of the application, the cloud management node 2100 may determine, according to a running status of the application, whether the application needs to be migrated. Further, FIG. 4 shows an application migration method 3000 according to an embodiment of the present application. The application migration method 3000 may be applied to the cloud computing data center shown in FIG. 2, and may be executed by the cloud management node 2100. Further, the application migration method 3000 may be executed by the cloud management node 2100 in the apparatus shown in FIG. 2.

Further, as shown in FIG. 4, the method 3000 includes the following steps.

Step S3100. Obtain real-time monitoring information of running of an application on a first instance, where the real-time monitoring information reflects an execution status of the application in the first instance.

In this embodiment of the present application, the cloud management node 2100 may include a cloud monitoring system. A cloud monitoring control module 2140 in the cloud monitoring system is configured to monitor a running process of the application, and obtain real-time monitoring information in the running process of the application. The real-time monitoring information reflects an execution status of the application in the first instance. The real-time monitoring information may include a service level objective (SLO) of the application, a resource use status of the application, execution efficiency information of the application, and the like. The execution efficiency information of the application includes a throughput when the application runs, and an actual time (responseTime) of response of the application to an external request. The cloud monitoring system in the cloud management node 2100 may further include a cloud monitoring database. The cloud monitoring database is used to store the real-time monitoring information, obtained by monitoring by the cloud monitoring control module 2140, of the application.

Optionally, when the application runs, some monitoring statistical information may be written into a log file. The cloud monitoring control module 2140 may obtain the real-time monitoring information of the application by collecting a log and extracting data from the log according to a rule, and store the real-time monitoring information into the cloud monitoring database.

Optionally, the computer device may further include a cloud monitoring service agent module. The cloud monitoring service agent module is configured to monitor related data (for example, a CPU, memory, IO, and a network) when the application runs on an instance. The related data is real-time monitoring information of the computer device. The cloud monitoring service agent module reports the related data to the cloud monitoring database. Alternatively, the computer device may store, using another module, the related data when the application runs, and the cloud monitoring control module 2140 obtains the related data and stores the related data into the cloud monitoring database.

Step S3200. Determine, according to the real-time monitoring information, whether to migrate the application from the first instance to a second instance, where the second instance is created in a second instance creation manner, and the second instance creation manner is different from the first instance creation manner.

In this embodiment of the present application, the virtualization technology analysis module 2120 in the cloud management node 2100 may further include an in-running analysis submodule 2122. The cloud monitoring control module 2140 determines the real-time monitoring information according to an execution status and a resource use status existing when the application runs, and sends the real-time monitoring information to the in-running analysis submodule 2122. The in-running analysis submodule 2122 may determine, according to the real-time monitoring information, whether to migrate the application from the first instance to the second instance, where the second instance is created in the second instance creation manner, and the second instance creation manner is different from the first instance creation manner.

Optionally, in an embodiment, the in-running analysis submodule 2122 may determine, according to the real-time monitoring information using a reinforcement learning reinforcement learning algorithm, a first reward obtained when the application is retained in the first instance and is not migrated, and a second reward obtained when the application is migrated from the first instance to the second instance, and when the first reward is higher than or equal to the second reward, determine to retain the application in the first instance and not to migrate the application, or when the first reward is lower than the second reward, determine to migrate the application from the first instance to the second instance.

Further, the in-running analysis submodule 2122 may separately determine the first reward and the second reward according to the real-time monitoring information using the reinforcement learning algorithm, as shown in Table 1.

TABLE 1

|    | A1  | A2  | A3  | A4  |
|----|-----|-----|-----|-----|
| S1 | R11 | R12 | R13 | R14 |
| S2 | R21 | R22 | R23 | R24 |
| S3 | R31 | R32 | R33 | R34 |

S indicates that the application is in a state. For example, S1, S2, and S3 in Table 1 may respectively correspond to three different states of the application, and all S's in the table, that is, S1, S2, and S3 in Table 1, represent all performance states of the application that correspond to a currently used virtualization technology state. For example, S1 may represent a CPU utilization of 0 to 10%, S2 may represent a CPU utilization of 10% to 30%, and S3 may represent a CPU utilization higher than 30%. That is, when a virtualization technology is determined, the resource use status may include different states. The different states may be represented by S's, and a current state is one of the different states. A in Table 1 represents an action of migrating or not migrating the application. For example, for A1, A2, A3, and A4 in Table 1, A1 may represent an action of retaining the application in the first instance and not migrating the application, and A2, A3, and A4 respectively represent actions of migrating the application from the first instance to instances created in three other creation manners. R represents a reward. For example, for the first row of R values in Table 1, R11 may represent a first reward, that is, a reward obtained when the application is retained in the first instance and is not migrated, and R12, R13, and R14 are all second rewards, that is, rewards respectively obtained when the application is migrated from the first instance to the instances created in the three other creation manners. When R11 is the largest, the application is retained in the first instance and is not migrated. When at least one of R12, R13, or R14 is greater than R11, the application is migrated from the first instance to the second instance, and the second instance corresponds to a largest value among R12, R13, and R14.

It should be understood that an R value in Table 1 may be calculated according to a related indicator using a function. The related indicator may be performance of the application, for example, a response time, a resource utilization, a migration overhead, or a virtualization technology overhead of the application. In addition, Table 1 may be set to be updated at a time interval. After the application is migrated from the first instance to the second instance, a corresponding reward in Table 1 should be updated in time.

Optionally, in an embodiment, a reward in Table 1 may be calculated according to the following formula (1):

$$A * \frac{1 - e^{-\left(1 - \frac{responseTime}{Time}\right)}}{\prod Utilization} * (1 + CostOfTransition) * (1 + CostOfTechnology) \tag{1}$$

A represents an adjustment coefficient, responseTime represents an actual time of response of the application to an external request and is obtained from the real-time monitoring information, Time represents a preset time of response of the application to the external request, Utilization represents a resource utilization of each of multiple resources occupied when the application runs, that is, a percentage of a resource already utilized by the application in a resource occupied by the application, and $\prod^{Utilization}$ represents a product of multiple resource utilizations. CostOfTransition is a migration overhead, and a value of CostOfTransition is associated with a reward to be calculated. When the reward to be calculated according to the formula is the first reward obtained when the application is retained in the first instance, the value of CostOfTransition is 0. When the reward to be calculated according to the formula is the second reward obtained when the application is migrated from the first instance to the second instance, CostOfTransition represents a sum of an overhead for migration from the first instance and an overhead for migration to the second instance. CostOfTechnology is a virtualization technology overhead. For each virtualization technology, corresponding CostOfTechnology may be a constant. Further, CostOfTechnology may be calculated according to CostOfTechnology=Σ(B*C). B represents multiple overheads generated by a virtualization technology, C represents a weight of B in the application, and a value of B is associated with a reward to be calculated. When the reward to be calculated according to the formula is the first reward obtained when the application is retained in the first instance, B is set to each of multiple overheads generated by a virtualization technology corresponding to the first instance creation manner. When the reward to be calculated according to the formula is the second reward obtained when the application is migrated from the first instance to the second instance, B is set to each of multiple overheads generated by a virtualization technology corresponding to the second instance creation manner. Further, B may represent a performance overhead, for example, a CPU overhead, a memory overhead, a network overhead, or a magnetic disk IO overhead.

Optionally, in an embodiment, a reward in Table 1 may be calculated according to the following formula (2):

$$A * \frac{1 - e^{-\left(1 - \frac{throughput}{TP}\right)}}{\prod Utilization} * (1 + CostOfTransition) * (1 + CostOfTechnology) \tag{2}$$

A represents an adjustment coefficient, throughput is obtained from the real-time monitoring information, and represents a throughput when the application runs, and TP represents a preset value of the throughput when the application runs. It should be understood that the throughput herein may be a data throughput, that is, throughput represents a data throughput when the application runs, and corresponding TP represents a preset value of the data throughput when the application runs. Alternatively, throughput may be a throughput brought by a network IO request, that is, throughput represents the throughput brought by the network IO request when the application runs, and corresponding TP represents a preset value of the throughput brought by the network IO request when the application runs. This embodiment of the present application is not limited thereto. Utilization represents a utilization of each of multiple resources occupied when the application runs, that is, a percentage of a resource already utilized by the application in resources occupied by the application, and $\Pi^{Utilization}$ represents a product of multiple resource utilizations. CostOfTransition and CostOfTechnology are similar to those in the formula (1). CostOfTransition is a migration overhead, and a value of CostOfTransition is associated with a reward to be calculated. When the reward to be calculated according to the formula is the first reward obtained when the application is retained in the first instance, CostOfTransition is set to 0. When the reward to be calculated according to the formula is the second reward obtained when the application is migrated from the first instance to the second instance, CostOfTransition represents a sum of an overhead for migration from the first instance and an overhead for migration to the second instance. CostOfTechnology is a virtualization technology overhead. CostOfTechnology=Σ (B*C). B represents multiple overheads generated by a virtualization technology, C represents a weight of B in the application, and a value of B is associated with a reward to be calculated. When the reward to be calculated according to the formula is the first reward obtained when the application is retained in the first instance, B is set to each of multiple overheads generated by a virtualization technology corresponding to the first instance creation manner. When the reward to be calculated according to the formula is the second reward obtained when the application is migrated from the first instance to the second instance, B is set to each of multiple overheads generated by a virtualization technology corresponding to the second instance creation manner. Further, B may represent a performance overhead, for example, a CPU overhead, a memory overhead, a network overhead, or a magnetic disk IO overhead.

In this embodiment of the present application, a reward in Table 1 may be determined using multiple manners or formulas, for example, determined using the formula (1) or the formula (2), or determined using another formula obtained by performing equivalent transformation and modification on the formula. For each calculation manner, a migration overhead CostOfTransition and a virtualization technology overhead CostOfTechnology are included, but a performance parameter may differ. The performance parameter may be determined according to an actual requirement of the application. For example, a performance parameter in the formula (1) is a response time responseTime, and for some applications that have a requirement on the response time, the reward may be calculated according to the formula (1), a performance parameter in the formula (2) is a throughput, for an application insensitive to the response time, for example, offline analysis, that has a relatively high requirement on the throughput and is insensitive to the response time, and the formula (2) may be used. Optionally, the performance parameter may be another parameter, for example, an analysis speed (analyseSpeed), and a corresponding formula may be obtained by performing corresponding transformation and adjustment. This embodiment of the present application is not limited thereto. In actual application, for different types of applications, different data center scales, and different types of data center architectures, an optimal effect can be obtained only by optimizing a learning method and a function thereof according to a specific environment. This is also a characteristic of a machine learning algorithm.

In this embodiment of the present application, a reward in Table 1 may be determined using the formula (1) or the formula (2). The two formulas are both related to a migration overhead CostOfTransition and a virtualization technology overhead CostOfTechnology. Optionally, the virtualization technology analysis module 2120 may further include a knowledge base. The knowledge base is mainly used to provide support for the in-running analysis submodule 2122, for example, may be used to store data required for calculating CostOfTransition and CostOfTechnology.

Further, the knowledge base may store the virtualization technology overhead, a virtualization technology migration overhead, historical learning system optimization information, and the like. That the knowledge base stores the historical learning system optimization information means that when the in-running analysis submodule 2122 calculates a reward using a machine learning algorithm such as reinforcement learning, a historical storage state set is stored as optimized input information for subsequent learning.

Optionally, in an embodiment, to calculate a value of CostOfTechnology, overhead values shown in Table 2 may be stored in the knowledge base.

TABLE 2

| | Network overhead | CPU overhead | Memory overhead | Magnetic disk IO overhead |
|---|---|---|---|---|
| KVM | | | | |
| XEN | | | | |
| Container | | | | |
| OSv | | | | |
| Bare-metal | | | | |

Table 2 is mainly used to list overheads generated when virtualization is performed on various resources in various instance creation manners, that is, an occupation status of a corresponding resource occupied when an instance creation manner or a virtualization technology is used. The occupation status includes a used resource and a wasted resource. Each row may correspond to an instance creation manner, and herein, only five instance creation manners are used as an example for description. Each column corresponds to a performance overhead, and herein, only four overheads are used as an example for description.

It should be understood that, each overhead value in Table 2 is a relative value, that is, a percentage of a corresponding consumed time in an entire time or a percentage of a consumed resource to an entire resource when an application runs on an instance created in an instance creation manner. A value range of each overhead value in Table 2 is 0 to positive infinity. When the overhead value is set to 0, a physical machine (bare-metal) is indicated. An overhead value shown in FIG. 2 may be substituted into the formula (1) and the formula (2), to calculate values of CostOfTechnology.

Optionally, in an embodiment, overhead values shown in Table 3 may further be stored in the knowledge base.

TABLE 3

|  | In-migration overhead | Out-migration overhead |
|---|---|---|
| KVM | | |
| XEN | | |
| Container | | |
| OSv | | |
| Bare-metal (bare-metal) | | |

Table 3 shows an overhead required for migrating application data of an instance from one instance to another instance. The overhead may be used for calculating the values of CostOfTransition in the formulas (1) and (2). Each row may correspond to an instance creation manner. Herein, only five instance creation manners are used as an example for description. In Table 3, one column corresponds to an overhead required for migrating the application data from the instance, and another column corresponds to an overhead required for migrating the application data to an instance.

It should be understood that an overhead value in Table 3 may also be a relative value. For example, for calculation of each out-migration overhead value in the out-migration overhead column in Table 3, times that are spent on out-migration of a unit data volume and correspond to different instance creation manners may first be calculated, and then one instance creation manner is used as a reference to separately calculate a relative value of another instance creation manner relative to the reference, that is, an out-migration overhead value of the instance creation manner. For example, a bare-metal is used as the reference, a time spent on out-migration of a unit data volume is calculated, and a ratio of a result calculated for another instance creation manner to a result of the bare-metal is calculated. The ratio is an overhead value of the other instance creation manner, and an out-migration overhead value of the bare-metal is set to 1. Similarly, calculation of an in-migration overhead value is similar to that of the out-migration overhead value, and a calculated value is also a relative value.

In this embodiment of the present application, the in-running analysis submodule 2122 in the virtualization technology analysis module 2120 may determine whether to perform migration using the foregoing reinforcement learning algorithm, or may determine whether to perform migration in another manner. This embodiment of the present application is not limited thereto.

For example, in a small-scale cloud data center, generally optimization may be performed on some types of clouds, such as, a game cloud, a financial cloud, and an application cloud. In these clouds, optimization is performed, from different perspectives, on main applications centralized in the data center in order to meet requirements of different cloud users. Some main applications such as a database, a cache, and a web service have a relatively apparent characteristic and a resource requirement type. Therefore, if a small-scale cloud data center has a relatively simple environment, a comprehensive machine learning analysis system such as the foregoing reinforcement learning algorithm does not need to be used, and only a simple decision tree can be used to analyze whether to perform instance migration.

Further, a database is used as an example. The database is a relatively common application, with an apparent characteristic, in a cloud data center, and such an application has a large amount of data, which is difficult to migrate. To create an instance for the application, generally a VM large enough is created, to cope with continuous expansion of a user data volume. The cloud monitoring control module 2140 may continuously monitor the database during a running period of the database, and collects real-time monitoring information including an SLA, a throughput, a query queue status, and the like. The in-running analysis submodule 2122 may perform analysis according to the real-time monitoring information. For example, when the database runs at a task stage, there is no query operation on the database. In this case, it may be considered that all resources allocated to the database are in a wasted state. The wasted state herein may be defined as follows. Whether the database is currently in use may be identified according to a monitored throughput, a query queue status, and statuses, identified from a task processing model of an application, of access to the database in different stages. If the database is not currently in use, the database does not have a task (for example, a retrieval task) to execute, or the database is in an idle state, and all the resources allocated for the database are in the wasted state. In this case, the in-running analysis submodule 2122 may migrate, according to a corresponding policy of the database, an unused database to a container, that is, the database is migrated from a first instance VM to a second instance container. In this way, resource waste can be avoided, and no data is lost from the database.

For another example, the first instance currently used by the application is a VM, and the in-running analysis submodule 2122 may determine, according to the real-time monitoring information of the application, that at a work stage of the application, memory used by the application always changes slowly (for example, increases slowly, or decreases slowly). In this case, migrating the application to a container has a better effect. In this way, because a memory resource of the container may be changed at any time, migration to the container may not waste memory. If the in-running analysis submodule 2122 determines, according to the real-time monitoring information, that a volume of memory used by the application at a stage is fixed, the application may continue using the VM without migration.

For another example, the first instance currently used by the application is a VM, and the in-running analysis submodule 2122 determines, according to the real-time monitoring information of the application, that the application has a large quantity of threads and context switching at a work stage. In this case, performing scheduling using the VM causes a large quantity of CPU overheads (because the VM itself virtualizes a CPU, related multi-thread switching causes a greater overhead). In this case, migration to the container has a better effect (regard).

For another example, when the first instance currently used by the application is a container, and the in-running analysis submodule 2122 determines, according to the real-time monitoring information, that the application needs to operate kernel sensitive data at a work stage, insecurity to another container may be caused according to a case in which containers share a same kernel. Therefore, at such a work stage, the application should be migrated to the VM in consideration of security.

For another example, the first instance currently used by the application is a container. During migration of the container, for example, when the application needs to be migrated as a whole to a physical machine, the container cannot completely process migration invoked by a system, but a VM can ensure complete migration. Therefore, when an instance in which the application is located needs to be migrated as a whole, the application may be migrated to the second instance first, and after the application runs in the VM, the application is migrated as a whole, for example, to the physical machine.

In this embodiment of the present application, as shown in FIG. 2, the cloud management node 2100 may further include a life cycle management module 2150. After the in-running analysis submodule 2122 in the virtualization technology analysis module 2120 determines that the application may be migrated from the first instance to the second instance, the cloud host management and control module 2130 may send a second instance creation command to a second computer device 2300 of the multiple computer devices, where the second instance creation command includes the second instance creation manner, and the second instance creation command is used to instruct the second computer device 2300 to create the second instance. After the second computer device 2300 completes instance creation, the cloud host management and control module 2130 may send a migration task to the life cycle management module 2150. According to the migration task, the life cycle management module 2150 stops running of the application in the first instance, and runs the application in the second instance, that is, migrates the application on line from the first instance to the second instance.

Further, the life cycle management module 2150 migrates the application from the first instance to the second instance, that is, instructs the second computer device to run the application in the second instance based on a data source used when the application runs in the first instance. Optionally, when the application is in a running state, the second computer device may further be instructed to obtain a running state of running of the application in the first instance, and run the application in the second instance based on the obtained running state.

Therefore, according to the method for automatic application deployment in this embodiment of the present application, virtualization technology can be automatically selected during application deployment, and moreover, whether to migrate the application from a current instance to another instance can be determined when the application runs. In this way, when a cloud data center supports more virtualization technologies, conventional application deployment which requires a user to determine an instance creation manner used by an application can be avoided. Work of the user can be reduced, problems of low application efficiency and data center resource waste that are caused by incorrect selection of the user can be avoided to an extent, and a virtualization technology type can be adjusted more flexibly when the application runs, thereby improving resource utilization, and avoiding resource waste.

The foregoing describes in detail, with reference to FIG. 1 to FIG. 4, the method for automatic application deployment according to this embodiment of the present application. The following describes, with reference to FIG. 5 to FIG. 8, an apparatus for automatic application deployment according to an embodiment of the present application.

FIG. 5 is a schematic block diagram of a cloud management node 4000 of a cloud computing data center according to an embodiment of the present application. The cloud computing data center includes multiple computer devices. The cloud management node 4000 is deployed on at least one of the multiple computer devices. As shown in FIG. 5, the cloud management node 4000 includes an application orchestration engine 4100, a virtualization technology analysis module 4200, and a cloud host management and control module 4300.

The application orchestration engine 4100 is configured to receive an application orchestration template input by a user.

The application orchestration engine 4100 is further configured to parse out an application model characteristic of an application from the application orchestration template.

The virtualization technology analysis module 4200 is configured to determine, according to the application model characteristic and a preset rule, a first instance creation manner corresponding to the application.

The cloud host management and control module 4300 is configured to determine a first computer device corresponding to the first instance creation manner in the multiple computer devices.

The cloud host management and control module 4300 is further configured to send a first instance creation command to the first computer device, where the first instance creation command is used to instruct the first computer device to create a first instance for the application according to the first instance creation manner.

Therefore, the cloud management node 4000 provided in this application can automatically select a virtualization technology during application deployment. When a cloud data center supports more virtualization technologies, conventional application deployment which requires a user to determine an instance creation manner used by an application can be avoided. Work of the user can be reduced, and problems of low application efficiency and data center resource waste that are caused by incorrect selection of the user can be avoided to an extent.

Optionally, the preset rule includes that if the application is a non-scalable application, the first instance creation manner is a bare-metal creation manner, the application orchestration engine 4100 is further configured to determine, according to auto scaling group information in the application orchestration template, that the application model characteristic includes that the application is the non-scalable application, and the virtualization technology analysis module 4200 is further configured to determine, according to the preset rule, that the first instance creation manner is the bare-metal creation manner when the application is the non-scalable application.

Optionally, the preset rule includes that if the application is not in a running state, or if a running state of the application is a stable state, the first instance creation manner is a container creation manner, the application orchestration engine 4100 is further configured to determine, according to processing content of the application in the application orchestration template, that the application model characteristic includes that the application is not in the running state, or the running state of the application is the stable state, and the virtualization technology analysis module 4200 is configured to determine, according to the preset rule, that the first instance creation manner is the container creation manner when the application is not in the running state, or the running state of the application is the stable state.

Optionally, the preset rule includes that if a time limit to a failover of the application is less than or equal to a preset value, the first instance creation manner is a container creation manner, the application orchestration engine 4100 is configured to determine, according to an SLA of the application in the application orchestration template, that the application model characteristic includes that the time limit to the failover of the application is less than or equal to the preset value, and the virtualization technology analysis module 4200 is further configured to determine, according to the preset rule, that the first instance creation manner is the container creation manner when the time limit to the failover of the application is less than or equal to the preset value.

Optionally, the preset rule includes that if the application supports an OSv operating system, the first instance creation manner is an OSv creation manner, the application orchestration engine 4100 is configured to determine, according to an operating system supported by the application in the application orchestration template, that the application model characteristic is that the application supports the OSv operating system, and the virtualization technology analysis module 4200 is configured to determine, according to the preset rule, that the first instance creation manner is the OSv creation manner when the application supports the OSv operating system.

Optionally, the first instance creation manner is a VM creation manner.

Optionally, the cloud management node 4000 further includes a cloud monitoring control module 4400. The cloud monitoring control module 4400 is configured to obtain real-time monitoring information of running of the application in the first instance, where the real-time monitoring information reflects an execution status of the application in the first instance. The virtualization technology analysis module 4200 is further configured to determine, according to the real-time monitoring information, whether to migrate the application from the first instance to a second instance, where the second instance is created in a second instance creation manner, and the second instance creation manner is different from the first instance creation manner.

Optionally, the multiple computer devices include a second computer device, the second computer device corresponds to the second instance creation manner, and the cloud management node 4000 further includes a life cycle management module 4500. The cloud host management and control module 4300 is configured to send a second instance creation command to the second computer device when the virtualization technology analysis module 4200 determines to migrate the application from the first instance to the second instance, where the second instance creation command is used to instruct the second computer device to create the second instance for the application according to the second instance creation manner. The life cycle management module 4500 is configured to migrate the application to the second instance for running.

Optionally, the life cycle management module 4500 is further configured to instruct the second computer device to run the application in the second instance based on a data source used when the application runs in the first instance.

Optionally, if the application is in the running state, the life cycle management module 4500 is further configured to instruct the second computer device to obtain a running state of running of the application in the first instance, and run the application in the second instance based on the obtained running state.

Optionally, the application is a database, and the virtualization technology analysis module 4200 is further configured to determine, according to the real-time monitoring information, that the database is in an idle state, and determine to migrate the application from the first instance to the second instance, where the second instance is created in the container creation manner.

It should be understood that, the cloud management node 4000 according to this embodiment of the present application may correspondingly perform the method 1000 in the embodiment of the present application. The cloud management node 4000 may correspond to the cloud management node 2100 in FIG. 2, and the foregoing and other operations and/or functions of modules of the cloud management node 4000 are used to respectively implement corresponding procedures of the method in FIG. 1. For brevity, details are not described herein again.

Therefore, the cloud management node 4000 in this embodiment of the present application can automatically select a virtualization technology during application deployment, and moreover, determine whether to migrate the application from a current instance to another instance when the application runs. In this way, when a cloud data center supports more virtualization technologies, conventional application deployment which requires a user to determine an instance creation manner used by an application can be avoided. Work of the user can be reduced, problems of low application efficiency and data center resource waste that are caused by incorrect selection of the user can be avoided to an extent, and a virtualization technology type can be adjusted more flexibly when the application runs, thereby improving resource utilization, and avoiding resource waste.

Figure 6:
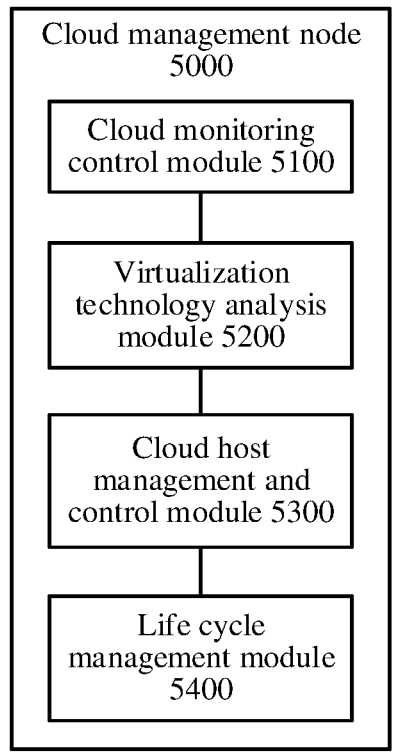
FIG. 6 is a schematic block diagram of a cloud management node of a cloud computing data center according to another embodiment of the present application.

FIG. 6 shows a schematic block diagram of a cloud management node 5000 of a cloud computing data center according to an embodiment of the present application. The cloud computing data center includes multiple computer devices. The cloud management node 5000 is deployed on at least one of the multiple computer devices. The multiple computer devices include a first computer device, and the first computer device creates a first instance for an application in a first instance creation manner. As shown in FIG. 6, the cloud management node 5000 includes a cloud monitoring control module 5100 configured to when the application runs in the first instance, obtain real-time monitoring information of running of the application in the first instance, where the real-time monitoring information reflects an execution status of the application in the first instance, and a virtualization technology analysis module 5200 configured to determine, according to the real-time monitoring information, whether to migrate the application from the first instance to a second instance, where the second instance is created in a second instance creation manner, and the second instance creation manner is different from the first instance creation manner.

Therefore, the cloud management node 5000 in this embodiment of the present application can determine whether to migrate the application from a current instance to another instance when the application runs. In this way, when a cloud data center supports more virtualization technologies, real-time analysis and switching of the virtualization technologies can be implemented, and a virtualization technology type can be adjusted more flexibly, thereby improving resource utilization, and avoiding resource waste.

Optionally, the multiple computer devices include a second computer device, the second computer device corresponds to the second instance creation manner, and the cloud management node 5000 further includes a cloud host management and control module 5300 configured to send a second instance creation command to the second computer device when the virtualization technology analysis module 5200 determines to migrate the application from the first instance to the second instance, where the second instance creation command is used to instruct the second computer device to create the second instance for the application according to the second instance creation manner, and a life cycle management module 5400 configured to migrate the application to the second instance for running.

Optionally, the life cycle management module 5400 is further configured to instruct the second computer device to run the application in the second instance based on a data source used when the application runs in the first instance.

Optionally, if the application is in a running state, the life cycle management module 5400 is further configured to instruct the second computer device to obtain a running state of running of the application in the first instance, and run the application in the second instance based on the obtained running state.

Optionally, the application is a database, and the virtualization technology analysis module 5200 is further configured to determine, according to the real-time monitoring information, that the database is in an idle state, and determine to migrate the application from the first instance to the second instance, where the second instance is created in the container creation manner.

It should be understood that, the cloud management node 5000 according to this embodiment of the present application may correspondingly perform the method 2000 in the embodiment of the present application. The cloud management node 5000 may correspond to the cloud management node 2100 in FIG. 2, and the foregoing and other operations and/or functions of modules of the cloud management node 5000 are used to respectively implement corresponding procedures of the method in FIG. 4. For brevity, details are not described herein again.

Therefore, the cloud management node 5000 in this embodiment of the present application can determine whether to migrate the application from a current instance to another instance when the application runs. In this way, when a cloud data center supports more virtualization technologies, real-time analysis and switching of the virtualization technologies can be implemented, and a virtualization technology type can be adjusted more flexibly, thereby improving resource utilization, and avoiding resource waste.

Figure 7:
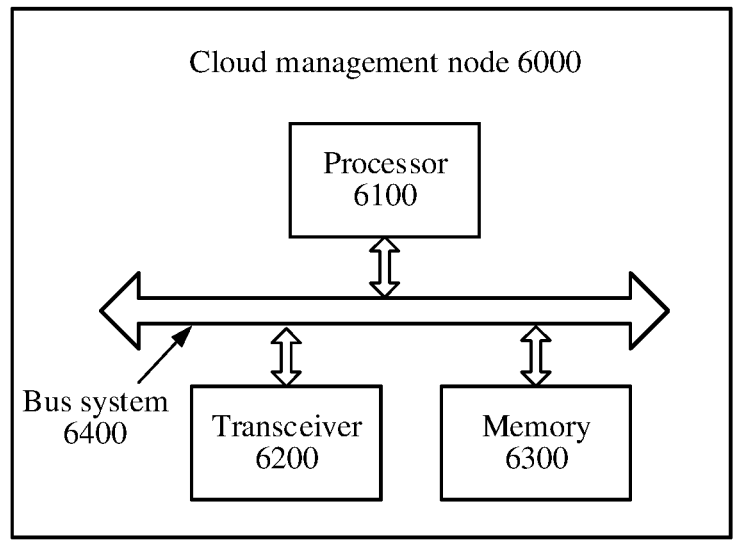
FIG. 7 is a schematic block diagram of a cloud management node of a cloud computing data center according to still another embodiment of the present application.

As shown in FIG. 7, an embodiment of the present application further provides a cloud management node 6000 of a cloud computing data center. The cloud computing data center includes multiple computer devices. The cloud management node 6000 is deployed on at least one of the multiple computer devices. The cloud management node 6000 includes a processor 6100 and a transceiver 6200, and the processor 6100 is connected to the transceiver 6200. Optionally, the cloud management node 6000 further includes a memory 6300, and the memory 6300 is connected to the processor 6100. Further, optionally, the cloud management node 6000 includes a bus system 6400. The processor 6100, the memory 6300, and the transceiver 6200 may be connected to each other using the bus system 6400. The memory 6300 may be used to store an instruction, and the processor 6100 is configured to execute the instruction stored in the memory 6300 in order to control the transceiver 6200 to send or receive information or a signal. The transceiver 6200 is configured to receive an application orchestration template input by a user. The processor 6100 is configured to parse out an application model characteristic of an application from the application orchestration template, determine, according to the application model characteristic and a preset rule, a first instance creation manner corresponding to the application, and determine a first computer device corresponding to the first instance creation manner in the multiple computer devices. The transceiver 6200 is further configured to send a first instance creation command to the first computer device, where the first instance creation command is used to instruct the first computer device to create a first instance for the application according to the first instance creation manner.

Optionally, the preset rule includes that if the application is a non-scalable application, the first instance creation manner is a bare-metal creation manner, and the processor 6100 is further configured to determine, according to auto scaling group information in the application orchestration template, that the application model characteristic includes that the application is the non-scalable application, and when the application is the non-scalable application, determine, according to the preset rule, that the first instance creation manner is the bare-metal creation manner.

Optionally, the preset rule includes that if the application is not in a running state, or if a running state of the application is a stable state, the first instance creation manner is a container creation manner, and the processor 6100 is further configured to determine, according to processing content of the application in the application orchestration template, that the application model characteristic includes that the application is not in the running state, or the running state of the application is the stable state, and determine, according to the preset rule, that the first instance creation manner is the container creation manner when the application is not in the running state, or the running state of the application is the stable state.

Optionally, the preset rule includes that if a time limit to a failover of the application is less than or equal to a preset value, the first instance creation manner is a container creation manner, and the processor 6100 is further configured to determine, according to an SLA of the application in the application orchestration template, that the application model characteristic includes that the time limit to the failover of the application is less than or equal to the preset value, and determine, according to the preset rule, that the first instance creation manner is the container creation manner when the time limit to the failover of the application is less than or equal to the preset value.

Optionally, the preset rule includes that if the application supports an OSv operating system, the first instance creation manner is an OSv creation manner, and the processor 6100 is further configured to determine, according to an operating system supported by the application in the application orchestration template, that the application model characteristic is that the application supports the OSv operating system, and determine, according to the preset rule, that the first instance creation manner is the OSv creation manner when the application supports the OSv operating system.

Optionally, the first instance creation manner is a VM creation manner.

Optionally, the processor 6100 is further configured to obtain real-time monitoring information of running of the application in the first instance, where the real-time monitoring information reflects an execution status of the application in the first instance, and determine, according to the real-time monitoring information, whether to migrate the application from the first instance to a second instance, where the second instance is created in a second instance creation manner, and the second instance creation manner is different from the first instance creation manner.

Optionally, the multiple computer devices include a second computer device, the second computer device corresponds to the second instance creation manner, and the transceiver 6200 is further configured to send a second instance creation command to the second computer device when the processor 6100 determines to migrate the application from the first instance to the second instance, where the second instance creation command is used to instruct the second computer device to create the second instance for the application according to the second instance creation manner. The processor 6100 is further configured to migrate the application to the second instance for running.

Optionally, the processor 6100 is further configured to instruct the second computer device to run the application in the second instance based on a data source used when the application runs in the first instance.

Optionally, if the application is in the running state, the processor 6100 is further configured to instruct the second computer device to obtain a running state of running of the application in the first instance, and run the application in the second instance based on the obtained running state.

Optionally, the application is a database, and the processor 6100 is further configured to determine, according to the real-time monitoring information, that the database is in an idle state, and determine to migrate the application from the first instance to the second instance, where the second instance is created in the container creation manner.

It should be understood that the cloud management node 6000 according to this embodiment of the present application may correspond to the cloud management node 4000 in the embodiment of the present application, and may correspondingly perform the method 1000 in the embodiment of the present application, and the foregoing and other operations and/or functions of modules of the cloud management node 6000 are used to respectively implement corresponding procedures of the method in FIG. 1. For brevity, details are not described herein again.

Therefore, the cloud management node 6000 in this embodiment of the present application can automatically select a virtualization technology during application deployment, and moreover, determine whether to migrate the application from a current instance to another instance when the application runs. In this way, when a cloud data center supports more virtualization technologies, conventional application deployment which requires a user to determine an instance creation manner used by an application can be avoided. Work of the user can be reduced, problems of low application efficiency and data center resource waste that are caused by incorrect selection of the user can be avoided to an extent, and a virtualization technology type can be adjusted more flexibly when the application runs, thereby improving resource utilization, and avoiding resource waste.

Figure 8:
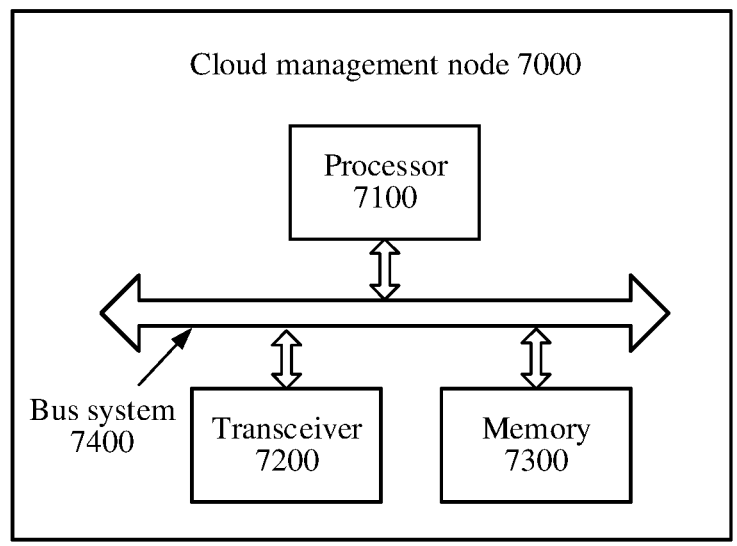
FIG. 8 is a schematic block diagram of a cloud management node of a cloud computing data center according to still another embodiment of the present application.

As shown in FIG. 8, an embodiment of the present application further provides a cloud management node 7000 of a cloud computing data center. The cloud management node 7000 is deployed on at least one of multiple computer devices. The multiple computer devices include a first computer device, and the first computer device creates a first instance for an application in a first instance creation manner. The cloud management node 7000 includes a processor 7100 and a transceiver 7200, and the processor 7100 is connected to the transceiver 7200. Optionally, the cloud management node 7000 further includes a memory 7300, and the memory 7300 is connected to the processor 7100. Further, optionally, the cloud management node 7000 includes a bus system 7400. The processor 7100, the memory 7300, and the transceiver 7200 may be connected to each other using the bus system 7400. The memory 7300 may be used to store an instruction, and the processor 7100 is configured to execute the instruction stored in the memory 7300 in order to control the transceiver 7200 to send or receive information or a signal.

The transceiver 7200 is configured to obtain real-time monitoring information of running of the application in the first instance when the application runs in the first instance, where the real-time monitoring information reflects an execution status of the application in the first instance.

The processor 7100 is configured to determine, according to the real-time monitoring information, whether to migrate the application from the first instance to a second instance, where the second instance is created in a second instance creation manner, and the second instance creation manner is different from the first instance creation manner.

Optionally, the multiple computer devices include a second computer device, the second computer device corresponds to the second instance creation manner, and the transceiver 7200 is further configured to send a second instance creation command to the second computer device when the processor 7100 determines to migrate the application from the first instance to the second instance, where the second instance creation command is used to instruct the second computer device to create the second instance for the application according to the second instance creation manner. The processor 7100 is further configured to migrate the application to the second instance for running.

Optionally, the processor 7100 is further configured to instruct the second computer device to run the application in the second instance based on a data source used when the application runs in the first instance.

Optionally, if the application is in the running state, the processor 7100 is further configured to instruct the second computer device to obtain a running state of running of the application in the first instance, and run the application in the second instance based on the obtained running state.

Optionally, the application is a database, and the processor 7100 is further configured to determine, according to the real-time monitoring information, that the database is in an idle state, and determine to migrate the application from the first instance to the second instance, where the second instance is created in the container creation manner.

It should be understood that the cloud management node 7000 according to this embodiment of the present application may correspond to the cloud management node 5000 in the embodiment of the present application, and may correspondingly perform the method 3000 in the embodiment of the present application, and the foregoing and other operations and/or functions of modules of the cloud management node 7000 are used to respectively implement corresponding procedures of the method in FIG. 4. For brevity, details are not described herein again.

Therefore, the cloud management node 7000 in this embodiment of the present application can determine whether to migrate the application from a current instance to another instance when the application runs. In this way, when a cloud data center supports more virtualization technologies, real-time analysis and switching of the virtualization technologies can be implemented, and a virtualization technology type can be adjusted more flexibly, thereby improving resource utilization, and avoiding resource waste.

It should be understood that the foregoing method embodiments in the present application are applicable to a processor, or may be implemented by a processor. The processor may be an integrated circuit chip capable of processing signals. In an implementation process, steps in the foregoing method embodiments may be implemented using a hardware integrated logical circuit in the processor, or using instructions in a form of software. The foregoing processor may be a general-purpose processor, a digital signal processor (DSP), an application-specific integrated circuit (ASIC), a field programmable gate array (FPGA) or another programmable logical device, a discrete gate or a transistor logical device, or a discrete hardware assembly. The methods, the steps, and logical block diagrams that are disclosed in the embodiments of the present application may be implemented or performed. The general-purpose processor may be a microprocessor or the processor may be any normal processor, or the like. Steps of the methods disclosed with reference to the embodiments of the present application may be directly executed and accomplished by means of a hardware decoding processor, or may be executed and accomplished using a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present application may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random access memory (RAM), used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link dynamic random access memory (SLDRAM), and a direct rambus dynamic random access memory (DRDRAM). It should be noted that the memory of the systems and methods described in this specification includes but is not limited to these and any memory of another proper type.

The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a specific working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings, or direct couplings, or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for automatic application deployment, performed by a cloud management node deployed on at least one of a plurality of computer devices, wherein the method comprises:
   receiving an application orchestration template from a user;
   acquiring an application model characteristic of an application from the application orchestration template, wherein the application model characteristic comprises one of:
      auto scaling group information indicating the application is a non-scalable application;
      processing content information of the application indicating the application is not in a running state or that the running state of the application comprises a stable state;
      a service level agreement (SLA) of the application indicating a time limit to a failover of the application is less than or equal to a preset value;
      an operating system supported by the application indicating that the application supports an OSv operating system; or the operating system supported by the application indicating that the application does not support an OSv operating system;

determining, according to the application model characteristic and a preset rule stored in the cloud management node, a first computer device of the plurality of computer devices fit for deploying the application in a first instance creation manner selected based on the application model characteristic, wherein the first instance creation manner comprises one of a bare-metal creation manner, a container creation manner, or an OSv creation manner each associated with a different corresponding application model characteristic; and sending a first instance creation command to the first computer device, wherein the first instance creation command instructs the first computer device to create a first instance for the application according to the first instance creation manner.

2. The method of claim 1, wherein the preset rule comprises at least one of:

determining the first instance creation manner comprises the bare-metal creation manner when the application comprises the non-scalable application;

determining the first instance creation manner comprises the container creation manner when the application is not in the running state or the running state of the application comprises the stable state;

determining the first instance creation manner comprises the container creation manner when the time limit to the failover of the application is less than or equal to the preset value; or determining the first instance creation manner comprises the OSv creation manner when the application supports the OSv operating system.

3. The method of claim 1, wherein the application orchestration template does not include a platform or a virtualization technology of the application.

4. The method of claim 1, wherein the first instance creation manner comprises a virtual machine (VM) creation manner when the application does not support the OSv operating system.

5. The method of claim 1, further comprising:

obtaining real-time monitoring information of running the application in the first instance, wherein the real-time monitoring information comprises an execution status of the application in the first instance; and determining, according to the real-time monitoring information, to migrate the application from the first instance to a second instance, wherein the second instance is created in a second instance creation manner different from the first instance creation manner.

6. The method of claim 5, wherein the computer devices further comprise a second computer device corresponding to the second instance creation manner, and wherein the method further comprises:

sending a second instance creation command to the second computer device, wherein the second instance creation command instructs the second computer device to create the second instance for the application according to the second instance creation manner; and migrating the application to the second instance.

7. The method of claim 6, wherein migrating the application to the second instance for running comprises instructing the second computer device to run the application in the second instance based on a data source used when the application runs in the first instance.

8. The method of claim 6, wherein when the application is in the running state, migrating the application to the second instance comprises:

instructing the second computer device to obtain the running state of the application in the first instance; and running the application in the second instance based on the running state.

9. The method of claim 5, wherein the application comprises a database, and wherein determining to migrate the application from the first instance to the second instance comprises:

determining, according to the real-time monitoring information, that the database is in an idle state; and determining to migrate the application from the first instance to the second instance when the database is in the idle state, wherein the second instance is created in the container creation manner.

10. A cloud management node, comprising:

a processor; and a non-transitory computer-readable storage medium coupled to the processor and storing instructions which when executed by the processor, cause the processor to:

receive an application orchestration template from a user;

acquire an application model characteristic of an application from the application orchestration template, wherein the application model characteristic comprises one of:

auto scaling group information indicating the application is a non-scalable application;

processing content information of the application indicating the application is not in a running state or that the running state of the application comprises a stable state;

a service level agreement (SLA) of the application indicating a time limit to a failover of the application is less than or equal to a preset value;

an operating system supported by the application indicating that the application supports an OSv operating system; or the operating system supported by the application indicating that the application does not support an OSv operating system;

determine, according to the application model characteristic and a preset rule stored in the cloud management node, a first computer device of a plurality of computer devices fit for deploying the application in a first instance creation manner, wherein the plurality of computer devices belong to a cloud computing data center, wherein the first instance creation manner is selected based on the application model characteristic, and wherein the first instance creation manner comprises one of a bare-metal creation manner, a container creation manner, or an OSv creation manner each associated with a different corresponding application model characteristic; and send a first instance creation command to the first computer device, wherein the first instance creation command instructs the first computer device to create a first instance for the application according to the first instance creation manner.

11. The cloud management node of claim 10, wherein the preset rule comprises at least one of:

determining the first instance creation manner comprises the bare-metal creation manner when the application comprises the non-scalable application;

determining the first instance creation manner comprises the container creation manner when the application is not in the running state or the running state of the application comprises the stable state;

determining the first instance creation manner comprises the container creation manner when the time limit to the failover of the application is less than or equal to the preset value; or determining the first instance creation manner comprises the OSv creation manner when the application supports the OSv operating system.

12. The cloud management node of claim 10, wherein the application orchestration template does not include a platform or virtualization technology of the application.

13. The cloud management node of claim 10, wherein the first instance creation manner comprises a virtual machine (VM) creation manner when the application does not support the OSv operating system.

14. The cloud management node of claim 10, wherein the instructions further cause the processor to:

obtain real-time monitoring information of running the application in the first instance, wherein the real-time monitoring information comprises an execution status of the application in the first instance; and determine, according to the real-time monitoring information, to migrate the application from the first instance to a second instance, wherein the second instance is created in a second instance creation different from the first instance creation manner.

15. The cloud management node of claim 14, wherein the instructions further cause the processor to:

send a second instance creation command to a second computer device of the plurality of computer devices, wherein the second instance creation command instructs the second computer device to create the second instance for the application according to the second instance creation manner; and migrate the application to the second instance.

16. The cloud management node of claim 15, wherein the instructions further cause the processor to run the application in the second instance based on a data source used when the application runs in the first instance.

17. The cloud management node of claim 15, wherein the instructions further cause the processor to:

instruct the second computer device to obtain the running state of the application in the first instance; and run the application in the second instance based on the running state.

18. The cloud management node of claim 14, wherein the application comprises a database, and wherein the instructions further cause the processor to:

determine, according to the real-time monitoring information, that the database is in an idle state; and determine to migrate the application from the first instance to the second instance when the database is in the idle state, wherein the second instance is created in the container creation manner.

19. A computer program product comprising a non-transitory computer-readable medium storing program code thereon for automatic application deployment, the program code comprising instructions for executing a method performed by a cloud management node deployed on at least one of a plurality of computer devices that comprises:

receiving an application orchestration template from a user;

acquiring an application model characteristic of an application from the application orchestration template, wherein the application model characteristic comprises one of:

auto scaling group information indicating the application is a non-scalable application;

processing content information of the application indicating the application is not in a running state or that the running state of the application comprises a stable state;

a service level agreement (SLA) of the application indicating a time limit to a failover of the application is less than or equal to a preset value;

an operating system supported by the application indicating that the application supports an OSv operating system; or the operating system supported by the application indicating that the application does not support an OSv operating system;

determining, according to the application model characteristic and a preset rule stored in the cloud management node, a first computer device of the plurality of computer devices fit for deploying the application in a first instance creation manner selected based on the application model characteristic, wherein the first instance creation manner comprises one of a bare-metal creation manner, a container creation manner, or an OSv creation manner each associated with a different corresponding application model characteristic; and sending a first instance creation command to the first computer device, wherein the first instance creation command instructs the first computer device to create a first instance for the application according to the first instance creation manner.

20. The computer program product of claim 19, wherein the preset rule comprises:

determining the first instance creation manner comprises the bare-metal creation manner when the application comprises the non-scalable application;

determining the first instance creation manner comprises the container creation manner when the application is not in the running state or the running state of the application comprises the stable state;

determine the first instance creation manner comprises the container creation manner when the time limit to the failover of the application is less than or equal to the preset value; and determine the first instance creation manner comprises the OSv creation manner when the application supports the OSv operating system.

* * * * *